United States Patent [19]
Ong

[11] Patent Number: 5,874,374
[45] Date of Patent: *Feb. 23, 1999

[54] METHOD FOR PRODUCING ENGINEERED MATERIALS FROM SALT/POLYMER AQUEOUS SOLUTIONS

[75] Inventor: Estela Ong, Chicago, Ill.

[73] Assignee: Institute of Gas Technology, Des Plaines, Ill.

[*] Notice: The term of this patent shall not extend beyond the expiration date of Pat. No. 5,698,483.

[21] Appl. No.: 925,581

[22] Filed: Sep. 8, 1997

Related U.S. Application Data

[63] Continuation-in-part of Ser. No. 406,173, Mar. 17, 1995, Pat. No. 5,698,483.

[51] Int. Cl.$^6$ ..................................... C01B 13/14
[52] U.S. Cl. .................................. 501/12; 501/1; 501/94; 501/80; 501/81; 252/315.01; 252/315.2; 252/315.3; 423/3; 423/21.1; 423/23; 423/49; 423/53; 423/62; 423/69; 423/87; 423/89; 423/99; 423/111; 423/155; 423/263; 423/593; 423/604; 423/605; 423/606; 423/608; 423/618; 423/624; 423/635; 423/641; 423/138; 524/403; 524/406; 524/408; 524/413; 428/689; 264/44

[58] Field of Search ..................................... 501/1, 12, 94, 501/80, 81; 252/315.01, 315.2, 315.3; 423/3, 21.1, 23, 49, 53, 62, 69, 87, 89, 99, 111, 155, 263, 593, 604, 605, 606, 608, 618, 624, 635, 641, 138; 524/403, 406, 408, 413; 428/457, 689; 264/41, 44

[56] References Cited

U.S. PATENT DOCUMENTS

| | | |
|---|---|---|
| 2,900,245 | 8/1959 | Beller . |
| 3,330,697 | 7/1967 | Pechini . |
| 4,058,592 | 11/1977 | Quets . |
| 4,065,544 | 12/1977 | Hamling et al. . |
| 4,572,843 | 2/1986 | Saito et al. . |
| 4,915,733 | 4/1990 | Schutz et al. . |
| 5,049,371 | 9/1991 | Rinn et al. . |
| 5,057,147 | 10/1991 | Shaffer et al. . |
| 5,093,289 | 3/1992 | Braetsch et al. . |
| 5,149,361 | 9/1992 | Iyori et al. . |
| 5,177,036 | 1/1993 | Kunst et al. . |
| 5,250,101 | 10/1993 | Hidaka et al. . |
| 5,338,334 | 8/1994 | Zhen et al. . |
| 5,338,714 | 8/1994 | Rousset et al. . |
| 5,352,269 | 10/1994 | McCandlish et al. . |
| 5,358,695 | 10/1994 | Helble et al. . |
| 5,698,483 | 12/1997 | Ong ............................................. 501/1 |

FOREIGN PATENT DOCUMENTS

| | | |
|---|---|---|
| 2091398 | 1/1972 | France . |
| 8801990 | 3/1988 | WIPO . |
| 9416989 | 8/1994 | WIPO . |

OTHER PUBLICATIONS

Chick, L.A. et al., *Synthesis of Air–Sinterable Lanthanum Chromite Powders*, Proceedings of the First International Symposium on Solid Oxide Fuel Cells, vol. 89–11, pp. 171–187. (Date Unknown).

*Primary Examiner*—Michael Marcheschi
*Attorney, Agent, or Firm*—Speckman Pauley Petersen & Fejer

[57] ABSTRACT

A method for producing engineered materials from salt/polymer aqueous solutions in which an aqueous continuous phase having at least one metal cation salt is mixed with a hydrophilic organic polymeric disperse phase so as to form a metal cation/polymer gel. The metal cation/polymer gel is then treated to form a structural mass precursor, which structural mass precursor is heated, resulting in formation of a structural mass having predetermined characteristics based upon the intended application of the structural mass.

20 Claims, 1 Drawing Sheet

METHOD FOR PRODUCING ENGINEERED MATERIALS FROM SALT/POLYMER AQUEOUS SOLUTIONS

CROSS REFERENCE TO RELATED APPLICATION

This application is a Continuation-in-Part application of my application having Ser. No. 08/406,173, filed 17 Mar. 1995 U.S. Pat. No. 5,698483.

BACKGROUND OF THE INVENTION

Field of the Invention

This invention relates to a low-cost method for the production of engineered materials from salt/polymer aqueous solutions by which method engineered structures having a broad range of features and properties can be prepared, which features and properties can be preset for a wide range of applications. For example, the method of this invention is suitable for producing continuous thin films which can be utilized as surface protection against harsh environments (temperature, chemical, friction and grinding, etc.), as an electrochemical component, such as for solid oxide fuel cells and electroceramic membranes, porous filters and membranes, and as a surface with desired optical or decorative properties. The method of this invention may also be used to produce spherical granules of polycrystalline materials having good flowability and packing properties, and which are suitable for use as pigments, sorbents, catalysts, or as powders for efficient pressing and sintering into dense materials. The method of this invention may also be used to prepare materials having an engineered pore structure, for example porous ceramics having wide applications as filters, membranes, and chemical sorbents or reactants.

High technology ceramics are known for possessing a combination of good thermal, chemical, mechanical and electronic properties, making them unique for certain technical applications. Their usefulness, however, depends upon the manner in which they are produced, including the characteristics of the ceramic powders used as starting powders which are sintered to produce the ceramic product. In addition, methods for producing such high technology ceramics are generally of high cost due, in part, to the expense and difficulty associated with preparing suitable ceramic powders in large quantities.

SUMMARY OF THE INVENTION

Accordingly, it is one object of this invention to provide a method for producing engineered materials, including thin films, spherical granules, and porous ceramics, which is considerably less expensive than conventional methods.

It is another object of this invention to provide a method for producing engineered materials, including high technology ceramics, which eliminates the need for producing ceramic powders used as starting powders.

These and other objects of this invention are achieved by a method for producing engineered materials from salt/polymer aqueous solutions in which an aqueous continuous phase comprising at least one metal cation salt is mixed with a hydrophilic organic polymeric disperse phase, resulting in formation of a metal cation/polymer gel. The metal cation/polymer gel is then processed in a manner which produces a structural mass precursor. The structural mass precursor is then heated, forming a structural mass having predetermined characteristics based upon the intended application or applications of the structural mass. Structural masses which can be produced in accordance with the method of this invention include, but are not limited to, thin films, spherical granules, and porous ceramics. Thin films produced in accordance with the method of this invention can be used for surface protection against harsh environments, as electrochemical components, as porous filters and membranes, and as a surface having desired optical or decorative properties. Spherical granules produced in accordance with the method of this invention may be used as pigments, sorbents, catalysts, or as powders for efficient pressing and sintering into dense materials. By the term "spherical granules," we mean polycrystalline structures having a generally spherical shape. Porous ceramics produced in accordance with the method of this invention may be used as filters, membranes, and chemical sorbents or reactants.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
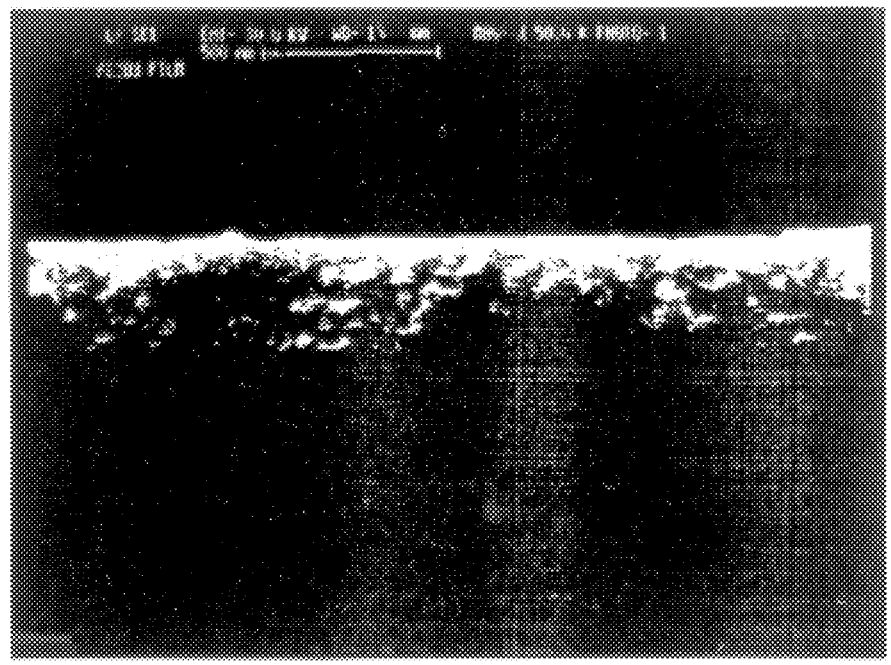
FIG. 1 is an SEM picture of a fractured cross section of a film coated glass showing a thin iron oxide film of uniform thickness produced in accordance with one embodiment of the method of this invention.

My earlier filed U.S. patent application, Ser. No. 08/406, 173 teaches the preparation of fine grained high surface area powders starting with an aqueous salt solution with a hydrophilic organic additive that forms a gelatinous intermediate liquid product which is then dried and calcined to form the powder. The method of the present invention provides an alternative treatment of the gelatinous intermediate liquid product to produce materials with structures and properties which can be engineered for a wide range of applications.

In accordance with each embodiment of the method of this invention, an aqueous continuous phase comprising at least one metal cation salt is mixed with a hydrophilic organic polymeric disperse phase, resulting in formation of a metal cation/polymer gel. The metal cation/polymer gel is then treated so as to produce a structural mass precursor of the structural mass end product, which structural mass precursor is then heated to form the end product structural mass having characteristics predetermined based upon the specific application of the end product structural mass.

By the term "gel" as used throughout the specification and claims, I mean a colloid in which a disperse phase is combined with a continuous phase to produce a viscous gel-like product. In the gel formed in accordance with the method of this invention, the disperse or colloidal phase is the hydrophilic organic polymer and the continuous phase is water. The metal cation salt is dissolved in the water. When the hydrophilic organic polymer is added to the aqueous metal salt solution, a gel is formed by virtue of the gelling property of the polymer. In this process, the hydrophilic organic polymer absorbs the liquid onto its structure due to chemical affinity. The amount and nature of the water absorbed depends on the chemical composition of the polymer. The hydrophilic absorption of the water causes the polymer to swell. This action is distinguishable from a sponge which, for example, absorbs water due to capillarity, although it may also absorb water by chemical absorption as in the method of this invention.

I have determined that hydrophilic organic materials serve as good media for uniformly absorbing the metal ions of aqueous soluble salts. Hydrophilic polymers, such as polyethylene glycol and some polyurethanes, have high capacities for retaining water. When a hydrophilic polymer is added to an aqueous metal salt solution, it swells as it absorbs the solution into its structure. The product is a gel with the metal salt solution "frozen" within the dispersed polymeric network. If the metal salt solution is dilute and the polymer added is not enough to gel the mixture, excess water may be driven off until the mixture is thick enough to form a gel. All hydrophilic organic material such as carbohydrates (sucrose, starches and cellulose) and carbohydrate derivatives; hydrophilic homopolymer and copolymers of ethylene oxide, 2-hydroxethylenemethacrylate, hydroxyalkyl-methacrylates, hydroxyalkylacrylates, acrylamide, and n-vinylpyrrolidone, hydrophilic polymer such as polyurethanes, polyurethane-acrylic, and polyurethane-methacrylic copolymers and interpenetrating polymer networks, and proteins derived from animal-protein-gelatins, and mixtures thereof are suitable for use in the method of this invention. In accordance with a particularly preferred embodiment, said organic material is polyethylene glycol.

Metal cation salts suitable for use in accordance with the method of this invention are selected from the group consisting of chlorides, carbonates, hydroxides, isopropoxides, nitrates, acetates, epoxides, oxalates, and mixtures thereof. Metal cations suitable for use in accordance with the method of this invention are selected from the group consisting of at least one metal from Group IA, IIA, IIIA, IVA, VA, VIA, IB, IIB, IIIB, IVB, VB, VIB, VIIB, and VIII of the Periodic Table of the Elements, lanthanides, actinides, and mixtures thereof.

Thin continuous films are produced in accordance with one embodiment of the method of this invention by applying a metal cation/polymer gel formed by mixing an aqueous continuous phase comprising at least one metal cation salt with a hydrophilic organic polymeric disperse phase to a substrate surface, forming a continuous thin film thereon. Upon drying and heat treatment, the continuous thin film forms a continuous ceramic layer over the substrate surface.

EXAMPLE I

A hydrated ferric nitrate salt was dissolved in water to form a solution. Polyethylene glycol was also dissolved in the solution. The solution was stirred over a hot plate to thicken, thickening occurring as a result of evaporation of free water. If the solution is too thick, the resulting continuous film is also thick and flakes off the substrate surface after drying. I found that a solution containing 6.45 grams of polyethylene glycol, 13.49% $Fe(NO_3)_3.9H_2O$ with the balance being $H_2O$, was thin enough to form a continuous reddish brown film on a glass slide. After heating to 500° C., the film remained continuous, transparent, and reddish brown. An SEM picture of a fractured cross section of the film coated glass is shown in FIG. 1, in which can be seen a thin iron oxide film of substantially uniform thickness.

In accordance with another preferred embodiment of the method of this invention, the structural mass precursor formed from the metal cation/polymer gel is formed by placing the metal cation/polymer gel in a hydrothermal reaction vessel and increasing the pressure inside the hydrothermal reaction vessel by heating, thereby forming a colloidal suspension therein. The colloidal suspension is then removed from the hydrothermal reaction vessel and heated, resulting in formation of a plurality of substantially spherical granules.

EXAMPLE II

Figure 2:
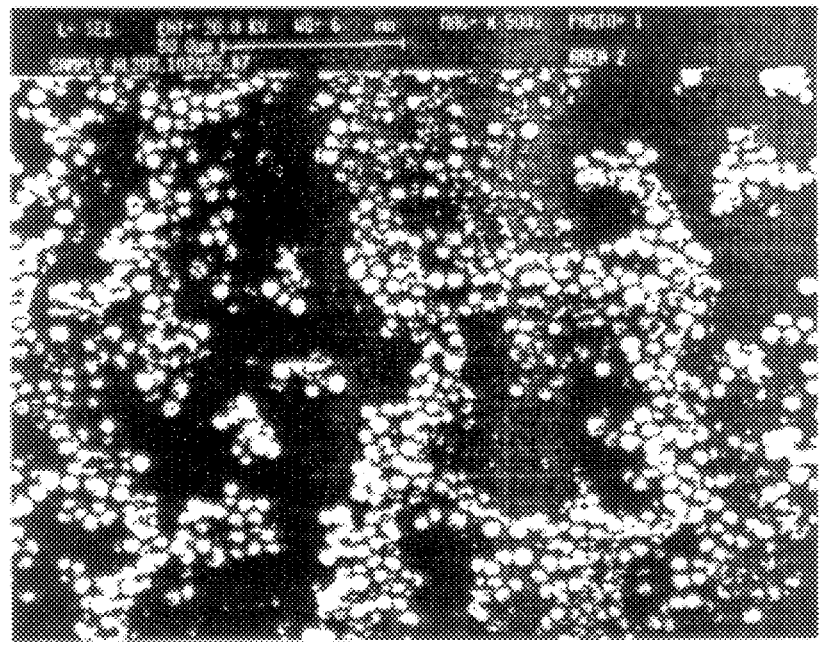
FIG. 2 is an SEM picture of a dried material of spherical granules 2–3 microns in diameter of aluminum oxide produced in accordance with one embodiment of the method of this invention.

To produce spherical granules in accordance with one embodiment of the method of this invention, an aluminum nitrate salt was dissolved in water after which polyethylene glycol was dissolved therein. The clear solution, containing 10.7% $Al(NO_3)_3.9H_2O$, 17.9% polyethylene glycol, and 71.4% water was contained in a TEFLON® (fluoropolymer) cup that had a cover. This, in turn, was placed in a hydrothermal reaction vessel which was placed in an oven at 150° C. for 20 hours. During this treatment, pressure in the hydrothermal reaction vessel increased due to the vapors or gaseous products from the thermal process. At the end of the hydrothermal treatment, the solution remained clear, but a white colloidal suspension settled at the bottom of the reaction vessel. The white colloidal suspension was filtered out and dried at about 100° C. FIG. 2 is an SEM picture of the dried material and shows spherical granules 2–3 microns in diameter of aluminum oxide.

Porous ceramics are produced in accordance with one embodiment of this invention wherein the structural mass precursor is formed by dissolving the metal cation/polymer gel in water to form a metal cation/polymer solution. A porous preform is immersed in the metal cation/polymer solution resulting in absorption of at least a portion of the metal cation/polymer solution into the porous preform. The saturated porous preform is then dried after which it is heated to a temperature suitable for burning out at least a portion of the porous preform, leaving behind a porous structure having a shape and porosity corresponding to the porous preform.

The preparation of porous bodies whose pore structures are replicas of the skeletal structures of porous preforms in accordance with this embodiment of this invention allows the preparation of a wide range of materials with predesigned pore structures. Porous materials such as papers, fabrics, threads, foams or monoliths, whether natural or synthetic, having random or ordered structure, can all be replicated by impregnating them with the metal cation/polymer solution which is subsequently converted to an oxide phase. If the preform is organic, it can be burned off in air, creating a pore structure in the oxide product that is a replica of its skeletal structure. Some organic preforms may also be pyrolyzed, leaving a fibrous material that may act as a reinforcement for the ceramic product. In accordance with another embodiment, if the porous preform is a metal or ceramics, upon heat treatment, it may form a compound or a composite with the salt material in the liquid.

EXAMPLE III

A solution was prepared by dissolving 40 grams of $Al(NO_3)_3.9H_2O$ in 25 grams of water. One gram of polyethylene glycol was dissolved in the solution. The solution was stirred over a hot plate during which it was allowed to thicken and fume. The combined weight reduced to just 30 grams, indicating that the aluminum salt had lost some of its water of hydration. Ten grams of water were added to the dried materials which dissolved the fulmed solid to a clear solution again. The final solution, therefore, weighed 40 grams, and contained 0.107 moles of aluminum nitrate and 1 gram of polyethylene glycol. A Fisher brand filter paper, rated 7-790A, was saturated with this solution and allowed to dry to a tacky sheet by hanging it in air. The tacky, saturated sheet was placed on an alumina plate and heated in air at a rate of 2° C. per minute up to a temperature of about 450° C. The material remained as a continuous sheet, mostly white, with brown specks. Under a microscope, the brown specks were determined to be fibers, presumably incompletely burned fibers of the filter material. The white material appeared as a continuous glassy phase with pores, which presumably were spaces originally occupied by the filter material that had burned off. There was no evidence of cracks in the resulting structure. The material was further treated by heating in air at a rate of about 2° C. per minute to 900° C. and held at this temperature for 5 hours. At the conclusion of this period, the sheet structure was retained, but had turned completely white. The pore openings, as well as its glassy appearance, also remained. The sheet structure was handleable, in spite of being only 7 mils thick with a density of 0.58 grams/cm$^3$, or 15% of the theoretical density of alumina.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A method for producing engineered materials from salt/polymer aqueous solutions comprising: (a) mixing an aqueous continuous phase comprising at least one metal cation salt with a hydrophilic organic polymeric disperse phase, thus forming a metal cation/polymer gel, (b) forming said metal cation/polymer gel into a structural mass precursor, and (c) heating said structural mass precursor, thus forming a structural mass.

2. A method in accordance with claim 1, wherein said hydrophilic organic polymeric disperse phase comprises an organic material selected from the group consisting of carbohydrates, polymers, proteins derived from animal protein gelatins, and mixtures thereof.

3. A method in accordance with claim 1, wherein said at least one metal cation salt is selected from the group consisting of chlorides, carbonates, hydroxides, isopropoxides, nitrates, acetates, epoxides, oxalates, and mixtures thereof.

4. A method in accordance with claim 1, wherein said metal cations are selected from the group consisting of at least one metal of Group 1A, 2A, 3A, 4A, 5A, 6A, 1B, 2B, 3B, 4B, 5B, 6B, 7B, and 8 of the Periodic Table, lanthanides, actinides, and mixtures thereof.

5. A method in accordance with claim 1, wherein said structural mass precursor is formed by (a) applying said metal cation/polymer gel to a substrate surface, thus forming a continuous film, (b) drying said continuous film to form a dried continuous film, and (c) heating said dried continuous film, thus forming a continuous ceramic layer on said substrate surface.

6. A method in accordance with claim 1, wherein said structural mass precursor is formed by (a) placing said metal cation/polymer gel in a hydrothermal reaction vessel, (b) increasing a pressure inside said hydrothermal reaction vessel by heating said hydrothermal reaction vessel, thus forming a colloidal suspension, (c) removing said colloidal suspension from said hydrothermal reaction vessel, and (d) heating said colloidal suspension, thus forming a plurality of spherical granules.

7. A method in accordance with claim 1, wherein said structural mass precursor is formed by (a) dissolving said metal cation/gel in water, thus forming a metal cation/polymer solution, (b) immersing a porous preform in said metal cation/polymer solution whereby at least a portion of said metal cation/polymer solution is absorbed by said porous preform, thus forming a saturated porous preform, (c) drying said saturated porous preform, thus forming a dried, saturated porous preform, and (d) heating said dried, saturated porous preform, thereby burning out at least a portion of said porous preform, and leaving behind a porous structure having a shape and porosity corresponding to said porous preform.

8. A method in accordance with claim 5, wherein said hydrophilic organic polymeric disperse phase is polyethylene glycol.

9. A method in accordance with claim 6, wherein said hydrophilic organic polymeric disperse phase is polyethylene glycol.

10. A method in accordance with claim 7, wherein said hydrophilic organic polymeric disperse phase is polyethylene glycol.

11. A method in accordance with claim 7, wherein said porous preform is a metal or a ceramic and heating of said metal or said ceramic forms a compound or a composite with said at least one metal cation salt in said metal cation/polymer solution.

12. A method in accordance with claim 7, wherein said porous preform is a material selected from the group consisting of paper, fabric, foam, and monoliths.

13. A method for producing engineered structural materials comprising the steps of: (a) mixing an aqueous solution comprising at least one metal cation salt with a hydrophilic organic material, thus forming a metal cation/polymer gel; (b) forming said metal cation/polymer gel into a structural mass precursor; and (c) heating said structural mass precursors, thus forming a structural mass.

14. A method in accordance with claim 13, wherein said hydrophilic organic material is selected from the group consisting of carbohydrates, polymers, proteins derived from animal protein gelatins, and mixtures thereof.

15. A method in accordance with claim 14, wherein said organic material is polyethylene glycol.

16. A method in accordance with claim 13, wherein said at least one metal cation salt is selected from the group consisting of chlorides, carbonates, hydroxides, isopropoxides, nitrates, acetates, epoxides, oxalates, and mixtures thereof.

17. A method in accordance with claim 13, wherein said metal cations are selected from the group consisting of at least one metal of Group 1A, 2A, 3A, 4A, 5A, 6A, 1B, 2B, 3B, 4B, 5B, 6B, 7B, and 8 of the Periodic Table, lanthanides, actinides, and mixtures thereof.

18. A method in accordance with claim 13, wherein said structural mass precursor is formed by (a) applying said metal cation/polymer gel to a substrate surface, thus forming a continuous film, (b) driving said continuous film, thus forming a dried continuous film, and (c) heating said dried continuous film, thus forming a continuous ceramic layer on said substrate surface.

19. A method in accordance with claim 13, wherein said structural mass precursor is formed by (a) placing said metal cation/polymer gel in a hydrothermal reaction vessel, (b) increasing a pressure inside said hydrothermal reaction vessel by heating said hydrothermal reaction vessel, thus forming a colloidal suspension, (c) removing said colloidal suspension from said hydrothermal reaction vessel, and (d) heating of said colloidal suspension, thus forming a plurality of substantially spherical granules.

20. A method in accordance with claim 13, wherein said structural mass precursor is formed by (a) dissolving said metal cation/gel in water, thus forming a metal cation/polymer solution, (b) immersing a porous preform in said metal cation/polymer solution, whereby at least a portion of said metal cation/polymer solution is absorbed by said porous preform, thus forming a saturated porous preform, (c) drying said saturated porous preform, thus forming a dried saturated porous preform, and (d) heating said dried, saturated porous preform, thereby burning out at least a portion of said porous preform, leaving behind a porous structure having a shape and porosity corresponding to said porous preform.

* * * * *